F. O. LEWIS.
EMERGENCY AXLE FOR AUTOMOBILES.
APPLICATION FILED MAR. 3, 1921.

1,380,870.

Patented June 7, 1921.

INVENTOR,
Frederick O. Lewis,
BY
Howard D. Smith,
His ATTORNEY

UNITED STATES PATENT OFFICE.

FREDERICK O. LEWIS, OF DAYTON, OHIO.

EMERGENCY-AXLE FOR AUTOMOBILES.

1,380,870. Specification of Letters Patent. Patented June 7, 1921.

Application filed March 3, 1921. Serial No. 449,523.

*To all whom it may concern:*

Be it known that I, FREDERICK O. LEWIS, a citizen of the United States, residing in the city of Dayton, in the county of Montgomery and State of Ohio, have invented certain new and useful Improvements in Emergency-Axles for Automobiles, of which the following is a specification.

The principal object of my invention is to provide an emergency rear axle for automobiles. It is simple and efficient in construction, and may be readily applied to a rear axle that has been broken.

Figure 1:
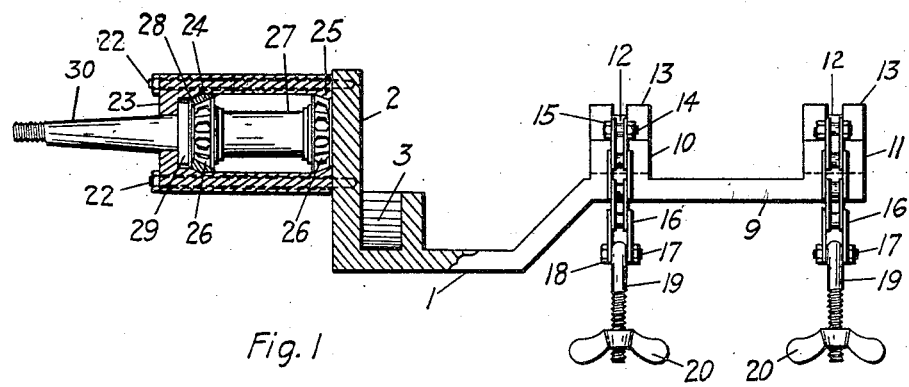
Figure 2:
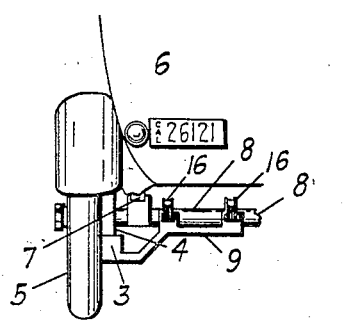
Figure 3:
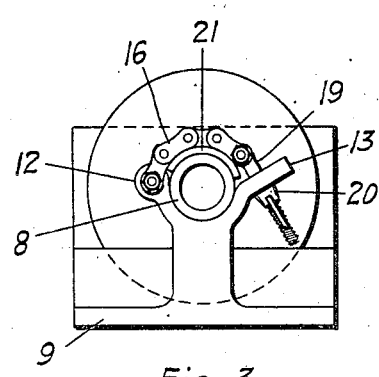

In the accompanying drawings, Figure 1 is a side elevational view, partly in section, of my emergency rear axle. Fig. 2 is a rear side view of the same applied to the rear axle of an automobile. And Fig. 3 is an end view of my emergency axle applied to the rear axle of an automobile.

Throughout the specification and drawings, similar reference characters denote corresponding parts.

Referring to the accompanying drawings, the numeral 1 designates an axle member constructed of suitable metal and having an outer flanged end 2. Immediately behind the latter, the axle member 1 has a slightly raised dished portion 3 adapted to fit around the base part of the brake drum 4 of a rear wheel 5 of an automobile 6. (See Figs. 1 and 2.)

At a point below the place of attachment of a rear spring 7 to the rear axle 8 of the automoible 6, the emergency axle member 1 inclines upwardly to a horizontal rear end portion 9. Projecting upwardly from the latter, are two lugs 10 and 11. Each of the latter has a concaved top from which there project outwardly two forked wing ends 12 and 13.

Secured by a bolt 14 and nut 15 to the forked end 12 of each of the lugs 10 and 11, is one end of a sprocket chain 16, to whose free end there is secured by a bolt 17 and nut 18, a stud 19 whose outer threaded end receives a wing nut 20. When the concave tops of the lugs 10 and 11 are fitted around the axle 8, the chains 16 are brought over a circumferential member 21 preferably placed on top of said axle, after which the studs 19 are passed through the forked ends 13 of said lugs and the wing nuts 20 screwed tightly against them to hold the axle member 1 firmly to the axle 8. (See Figs. 2 and 3.)

Referring to Fig. 1, there is secured to the upper part of the flanged end 2 of the axle 1, by horizontal studs 22, a bearing chamber 23. In a tapered race 24 mounted in the front end of said chamber, and in a tapered race 25 mounted in the rear end of said chamber, are tapered roller bearings 26 for the inner enlarged end 27 of an axle shaft. In front of the bearing race 24 is a steel washer 28, and between the latter and the front end of the bearing chamber 23, is placed a felt washer 29. Through a hole in the front end of the bearing chamber 23, in front of the felt washer 29, the outer end 30 of the axle shaft projects to receive the wheel 5. The purpose of the felt washer is to prevent the grease that is packed in the chamber 23, from oozing out of the latter around the axle shaft.

It is thus seen that I have provided an emergency axle that may be easily and quickly applied to a broken axle, to support the automobile wheel on the side on which the axle is broken.

I do not wish to be limited to the details of construction and arrangement herein shown and described, and any changes or modifications may be made therein within the scope of the subjoined claims.

Having described my invention, I claim:

1. A device of the type described, comprising an elongated member, a bearing secured to the front end of the latter, an axle shaft journaled in said bearing, and clamping means on the rear end of said elongated member for securing it firmly to the axle of an automobile.

2. A device of the type described, comprising an elongated member, a bearing chamber secured to the front end of said member, a pair of bearing races in said chamber, an axle shaft projecting into said chamber, bearings in said races for said axle shaft, and clamping means on the rear end of said elongated member for securing it firmly to the axle of an automobile.

3. A device of the type described, comprising an elongated member, a bearing secured to the front end of the latter, an axle shaft journaled in said bearing, lugs having concave tops projecting upwardly from the rear end of said elongated member, a pair of forked wings on the top of each lug, a chain for each lug, having one of its ends secured to one of the forked wings on said lug, a stud secured to the free end of said chain, adapted to be passed through the opposite forked wing of the lug, and a wing nut on said stud, for the purpose specified.

4. A device of the type described, comprising an elongated member, an upturned front end on said member, a bearing secured to said front end, an axle shaft journaled in said bearing, a dished portion of said elongated member immediately behind its upturned front end, to fit around the brake drum of an automobile, a raised horizontal rear end on said elongated member, and clamping means on said rear end for securing the elongated member firmly to the axle of an automobile.

In testimony whereof I have hereunto set my hand this 2nd day of March, 1921.

FREDERICK O. LEWIS.

Witness:
HOWARD S. SMITH.